T. F. FRANK.
Tea and Coffee Pot.
No. 86,522.
Patented Feb. 2, 1869.
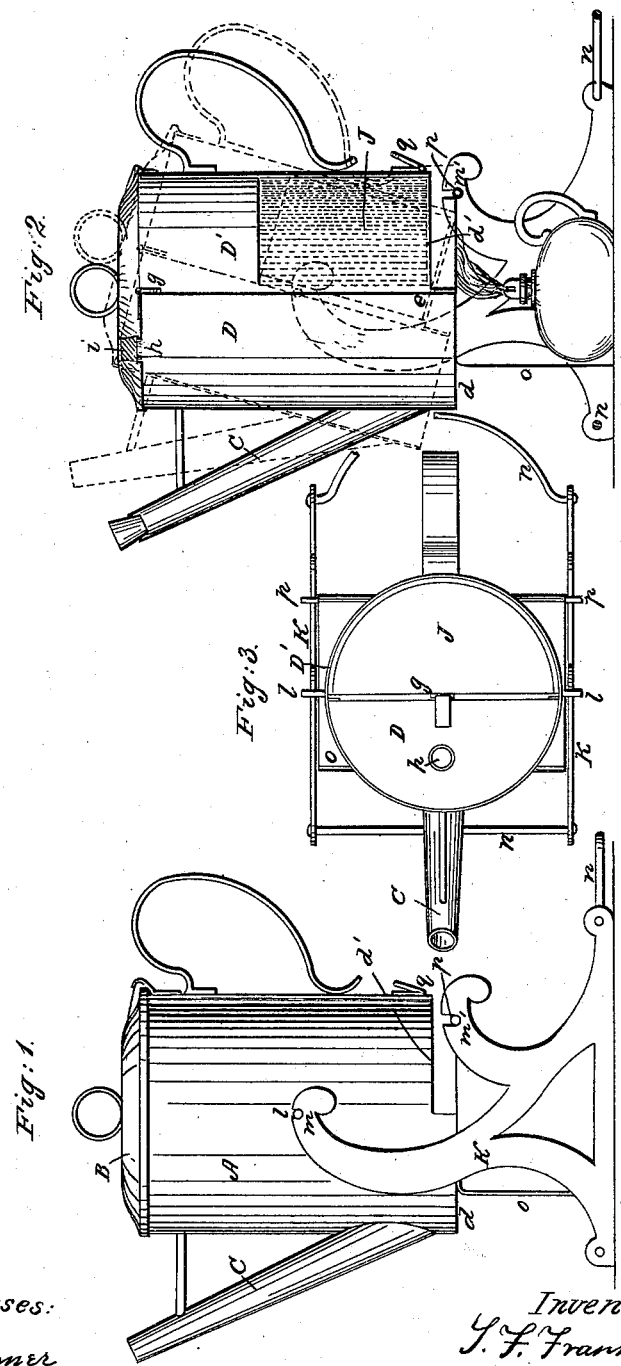
Witnesses:
Jno. J. Bonner
W. H. Becker.
Inventor:
T. F. Frank
by Forbush & Hyatt,
Attys.

THEODORE F. FRANK, OF BUFFALO, NEW YORK.

*Letters Patent No. 86,522, dated February 2, 1869.*

IMPROVEMENT IN TEA AND COFFEE-POTS.

The Schedule referred to in these Letters Patent and making part of the same.

*To all whom it may concern:*

Be it known that I, THEODORE F. FRANK, of the city of Buffalo, in the county of Erie, and State of New York, have invented certain new and useful Improvements in Tea and Coffee-Pots; and I do hereby declare that the following is a full and exact description thereof, reference being had to the accompanying drawings, making part of this specification.

The object of my invention is twofold—

First, to prevent the excessive boiling of the contents of a tea or coffee-pot, and the consequent escape of the steam into the apartment, and the loss of the aroma, and resulting deterioration in the quality of the beverage.

Second, the arrangement of a device for heating the pot by means of a lamp.

My invention consists—

First, of a tea or coffee-pot, divided vertically into two chambers, communicating with each other at the bottom, with the base of one removed from contact with the heating-surface, and so pivoted to a suitable frame, at or near its centre of gravity, that the generation of steam in the one chamber will produce a displacement of the liquid into the other, and a change in the centre of gravity of the pot, while the latter, in seeking to restore its lost equilibrium, gradually turns on its pivot, and automatically removes the bottom away from the heating-surface and checks ebullition, the condensation of the steam permitting a reflux of the liquid, and a return of the pot to its first position.

Second, the construction and arrangement of the frame and angle-plate for heating the pot by means of a lamp.

Third, in constructing one of the chambers so as to render it removable for cleaning the pot.

Fourth, in the construction of the lid of the pot with a cork, arranged to close the opening in the steam-generating chamber, as hereinafter described.

In the drawings—

A is the pot,
B is the lid,
C is the spout, and
D D', the two chambers thereof.

These chambers may be formed by a simple vertical partition dividing the vessel, leaving an opening, e, in the bottom, for the passage of the liquid from one chamber to the other.

I prefer, however, to divide the pot into the two compartments by making the chamber D a separate vessel, open at the bottom, and semi-cylindrical in cross-section, or of such other form as will conform to the sides of the pot, as shown in Figure III.

It may be retained in place by guides, formed of vertical angle-plates, *f f*, attached to the pot, as also shown in Fig. III, which permit the vessel D to be removed from the pot, when required, for cleaning the same.

*g* is a ring, for convenience in removing the vessel D from the pot.

An opening, *h*, is left in the top of the chamber D, which may be closed with a plug, but I prefer to attach a cork, *i*, or equivalent, to the under side of the cover, that will shut over the hole *h* when the lid is closed, as shown in Figure II.

J represents a perforated vessel, or cup, of lesser size than the chamber D', in which it is designed to be placed, for holding the tea or coffee, as the case may be, from which the decoction is to be made. The space left around this cup permits a free passage of the liquid to and from the tea or coffee.

The base of the pot is made with a jog or rebate, as shown, so that the bottom, *d'*, of the chamber D', will be removed from the influence and contact of the heating-surface beneath.

K K represent the two side portions of the frame for supporting the pot, which is pivoted at or near its centre of gravity, when filled to the ordinary extent, by gudgeons, *l*, attached thereto, which rest in bearings, *m* or *m'*, or their equivalent.

The parts K K are connected together by cross-bars, *n n*, or in any other suitable manner.

For heating a pot on a stove or range, it is arranged so as to be supported by the gudgeons *l*, resting in the lower bearings *m'*, the height of which are regulated, so that the portion *d* of the bottom, under chamber *d'*, will barely come in contact with the heating-surface.

For heating the pot by means of a lamp, the former is supported in the upper bearings, *m*, as shown in the drawings, while a thin angle-plate, *o*, is arranged under the pot, being supported by resting on one edge, and by lugs, P P, at the other, which fit in the notches *m'*.

This angle-plate prevents the lamp from blacking the bottom of the pot, and also prevents the flame from heating the bottom of the chamber D', as it otherwise would.

The rebate at the bottom of the pot should be formed at such a position that the centre of gravity, or a perpendicular line dropped from the pivots *l*, will fall just within the portion *d* of the base.

The operation of my improvement is as follows:

The tea or coffee, from which the beverage is to be prepared, is put into the cup J, and placed in the bottom of chamber D', and the required amount of water supplied to the pot. The end of the spout is then closed by a plug, or other suitable means, and the lid shut down, which it should be made to do snugly, the cork *i* closing the opening *h*, in the top of D, and rendering the latter air-tight, when the lower end is immersed in the liquid. The pot placed in this condition on the stove or plate *o*, as the case may be, the generation of steam in the compartment D causes a displacement of water therefrom, which, rising in the vessel D', causes a preponderance in the latter chamber, which produces a swinging of the pot on its axis *l*, that removes the portion *d* of the bottom away from the heating-surface, as shown in red lines, Fig. II, and checks ebullition. The condensation of the steam in chamber D causes a reflux of the liquid to that chamber, and restores the equilibrium, and the vessel to its former position. The temperature of the liquid in the pot is thus automatically regulated, and a decoction produced which possesses all of the finest qualities of the herb, which a boiling of the contents of the pot would greatly deteriorate, if not destroy.

The back of the pot, below the handle, is provided with a hinged leg, $g$, which is turned up out of the way during the preparation of the beverage, but which can be turned down so as to prevent the accidental tipping or inclination of the pot, when it is removed from the frame.

The purpose of the opening $h$ is to permit the escape of the air from the upper portion of the chamber D, in supplying water to the pot. As it is required to be open at the same time the pot is uncovered, and closed when the lid is shut, the arrangement of the cork $i$, in the latter, enables both objects to be accomplished without liability of mistake, and in the most simple manner.

What I claim as my invention, and desire to secure by Letters Patent, is—

1. The pot A, provided with a rebated bottom, $d\ d'$, and divided into compartments D D' communicating with each other, when pivoted to the frame K K, at or near its centre of gravity, so as to operate substantially as set forth.

2. The frame K K, provided with the two bearings $m\ m'$, and angle-plate $o$, when arranged as herein described.

3. The construction of the chamber D of a separate vessel, so as to be removable from the pot, for cleaning the same, substantially as set forth.

4. The lid B, provided with cork $i$, or equivalent, arranged for closing the opening $h$, as described.

T. F. FRANK.

Witnesses:
JAY HYATT,
JNO. J. BONNER.